Dec. 8, 1970   K. BEER   3,546,042
DEVICE FOR FEEDING BLANK TREAD STRIPS TO VEHICLE TIRES
Filed Oct. 14, 1966
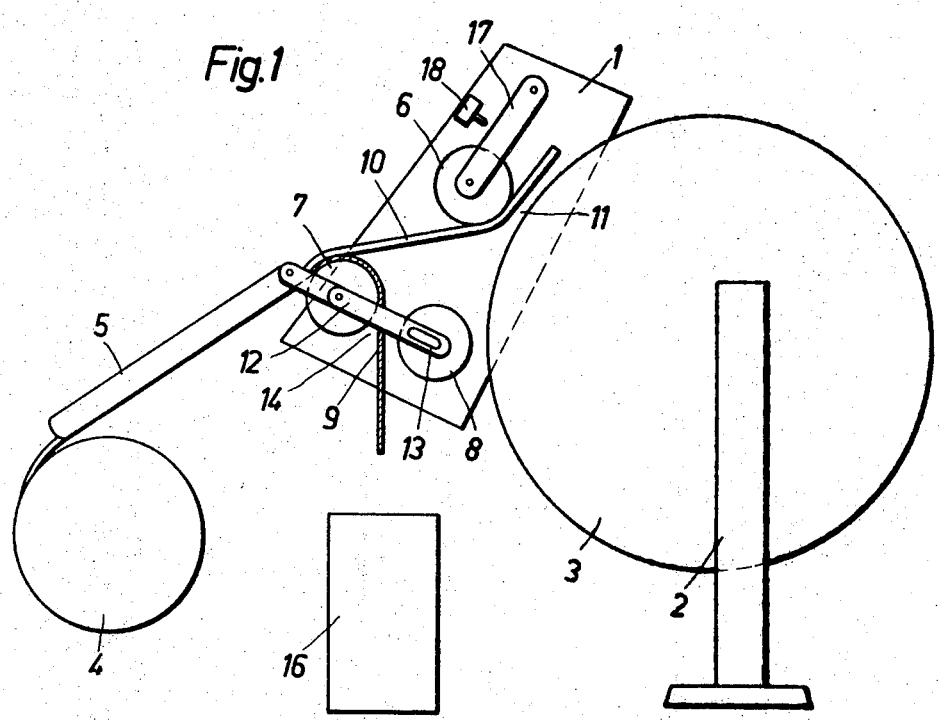
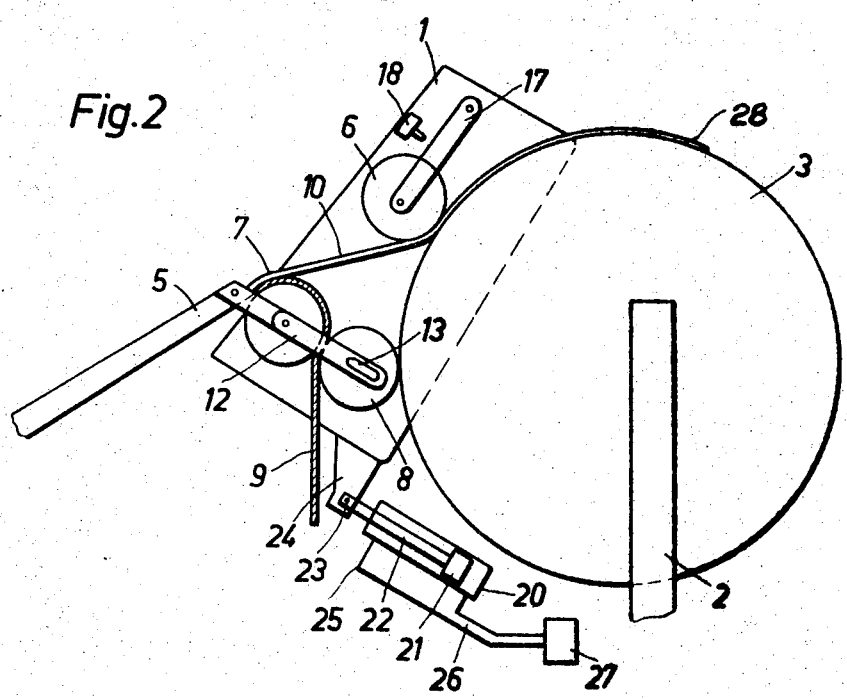
Inventor:
KARL BEER
Barnes, Kisselle Raisch & Choate
ATTORNEYS

United States Patent Office 3,546,042
Patented Dec. 8, 1970

3,546,042
DEVICE FOR FEEDING BLANK TREAD
STRIPS TO VEHICLE TIRES
Karl Beer, Fischbach-Weierbach (Nahe), Germany; Doris
Heck, administratrix of the estate of said Karl Beer, deceased
Filed Oct. 14, 1966, Ser. No. 603,070
Int. Cl. B29h 17/20
U.S. Cl. 156—395                    7 Claims

ABSTRACT OF THE DISCLOSURE

A device for feeding blank tread strip to vehicle tires which require retreading comprising a pair of rollers for removing support strip from the blank tread strip, and a guide roller for guiding blank tread strip onto a tire, the rollers being mounted on means movable toward and away from a tire to be retreaded, the arrangement being such that when the rollers are moved towards the tire to be retreaded rotation of the tire causes rotation of the pair of rollers and consequent movement of support strip between the pair of rollers and rotation of the guide roller for guiding the blank tread strip onto the tire.

---

This invention relates to a device for feeding blank tread strips to vehicle tires which require retreading.

Vehicle tires which require retreading to replace worn tread are first roughened in a roughening machine and thereupon covered with a blank tread strip in a covering machine, after which a vulcanization operation is carried out. For covering roughened tires, prepared blank tread strips are available commercially for the respective size of tire and for different cover thicknesses.

Feeding of the blank tread strip to the covering machine, for which purpose the blank tread strip is fed together with a support strip, gives rise to relatively great difficulties. The support strip has to be pulled off by hand and the operator, who is in a difficult stooping position while doing this, must also make sure that the blank tread strip is correctly positioned on the tire requiring retreading.

In covering machines a device is known for feeding blank tread strips for vehicle tires requiring retreading, in which a pair of rollers is driven by the tire and which pulls off a support strip fed together with the blank tread strip. In this known device it is very disadvantageous that the support strip is wound on a roller. As the work proceeds, the diameter of the roller varies and the roller must be replaced by a new receiving roller at the latest when a further increase in the diameter is no longer permitted by the guide in which the hub of the winding roller is mounted. In addition to the expensive exchange operation, it is also a disadvantage that the support strip must be subsequently removed from the receiving roller, which present difficulties particularly if the support strip has great adhesive power, so that it may be necessary for the support layer to be cut off.

According to the invention there is provided a device for feeding blank tread strip to vehicle tires which require retreading comprising a pair of rollers for removing support strip from the blank tread strip, and a guide roller for guiding blank tread strip onto a tire, the rollers being mounted on means movable toward and away from a tire to be retreaded, the arrangement being such that when the rollers are moved towards the tire to be retreaded rotation of the tire causes rotation of the pair of rollers and consequent movement of support strip between the pair of rollers and rotation of the guide roller for guiding the blank tread strip onto the tire.

In a preferred embodiment of the invention the roller of the pair of rollers which is adjacent the tire is mounted for sliding movement in a downwardly inclined plane such that when the rollers are moved away from the tire the gap between the pair of rollers in enlarged.

A specific embodiment of the invention will now be described by way of example with reference to the accompanying drawing, in which:

FIG. 1 illustrates diagrammatically the device according to the invention in the inoperative position, and FIG. 2 illustrates the device of FIG. 1 during operation.

In FIG. 1, 1 designates generally a device for feeding blank tread strips which is mounted on a covering machine 2 on which a vehicle tire 3 requiring retreading is mounted. The device 1 is adapted to swivel about a joint (not illustrated) and is shown in FIG. 1 in the position in which it is swung away from the covering machine. Blank tread strip 10 together with a support strip 9 is fed by a feed roller 4 by way of a guide 5 to the device 1.

In order to operate the device in the position illustrated in FIG. 1, the support strip 9 is pulled off the blank tread strip 10 and the latter is guided through the gap 11 formed between the tire 3 and a guide and sensing roller 6 mounted on the device 1. The support strip is guided through a gap 14 between two rollers 7, 8.

The pair of rollers 7, 8 is mounted on a common strut 12 which is inclined to the horizontal. The roller 8 adjacent the covering machine has a mounting 13 which is slidable along the length of the strut 12, so that when the device 1 is swung out the roller 8 moves away from the roller 7 thereby increasing the gap 14. Other devices, such as a spring-loaded mounting of the roller 8, which increases the gap 14 when the device 1 is swung out, are naturally also possible.

After the blank tread strip 10 has thus been led through the gap 11 and the support strip 9 through the gap 14, the device 1 is swung towards the covering machine 2, the roller 18 bearing against the tire and being forced against the roller 7 by means of the slidable mounting 13, so that the support strip 9 is clamped between the two rollers 7, 8. On the rotation of the tire 3 the roller 8 is driven and thus the blank tread strip is moved by the pair of rollers 7, 8 and the support strip is delivered to a container 16. When the device 1 is swung into the operative position the roller 6 causes the blank tread strip 10 to bear against the vehicle tire 3 requiring retreading. The roller 6 is mounted for rotation at one end of a lever 17 the other end of the lever being pivotally mounted on the device 1. When on the further turning of the tire 3 leading edge 28 of the blank tread strip 10 moves under the roller 6, the roller 6 is moved radially away from the tire 3 thus moving the lever 17 against a limit switch 18 which switches off the covering machine. The switch 18 may also be used to control other operations.

As shown in FIG. 2, the device 1 is moved by a compressed air cylinder 20 cooperating with a piston 21 and piston rod 22. The piston rod 22 is pivotally fastened at 23 on an arm 24 on the device 1. Compressed air supply pipes 25 and 26 are connected to a diagrammatically illustrated compressed air supply 27. When compressed air is fed through the supply pipe 25, a constant pressure force is applied to the piston 21 in the cylinder 20 whereby the device 1 is moved towards the tire to the position shown in FIG. 2. The piston 21 is moved to the left as viewed in the drawing to move the device 1 into the position illustrated in FIG. 1.

What is claimed is:
1. A device for feeding blank tread strip to vehicle tires which require retreading comprising a pair of rollers for removing support strip from the blank tread strip, and a guide roller for guiding blank tread strip onto a tire, the rollers being mounted on means movable toward and away from a tire to be retreaded, the arrangement being such that when the rollers are moved towards the tire to be retreaded rotation of the tire causes rotation of the pair of rollers and consequent movement of support strip between the pair of rollers and rotation of the guide roller for guiding the blank tread strip onto the tire, the roller of the pair of rollers which is adjacnt the tire is mounted for sliding movement in a plane which is downwardly inclined such that when the rollers are moved away from the tire the gap between the pair of rollers is enlarged.

2. A device as set forth in claim 1 including a limit switch, said tread urging roller being movable between the circumference of the tire and said limit switch.

3. A device as claimed in claim 1 wherein the roller of the pair of rollers which is adjacent the tire is mounted for sliding movement towards and away from the circumference of the tire and permanently acted upon by a force urging it towards the tire.

4. A device as claimed in claim 1 wherein the rollers of the plurality of rollers are mounted on a common carrier adapted to be moved towards and away from the tire.

5. A device for feeding blank tread strip to vehicle tires which require retreading comprising a pair of rollers for removing support strip from the blank tread strip, and a guide roller for guiding blank tread strip onto a tire, the rollers being mounted on means movable toward and away from a tire to be retreaded, the arrangement being such that when the rollers are moved towards the tire to be retreaded rotation of the tire causes rotation of the pair of rollers and consequent movement of support strip between the pair of rollers and rotation of the guide roller for guiding the blank tread strip onto the tire, the roller of the pair of rollers which is adjacent the tire is mounted for sliding movement toward the circumference of the tire, and means applying a force which urges the last-mentioned roller such that when the rollers are moved away from the tire the gap between the pair of rollers is enlarged.

6. A device as defined in claim 5 wherein said means for applying said force comprises means for mounting said roller such that it is urged by gravity downwardly.

7. A device as defined in claim 5 wherein said means for applying said force comprises a spring.

References Cited

UNITED STATES PATENTS

| 1,042,649 | 10/1912 | Crosby | 156—408XR |
| 1,256,716 | 2/1918 | Midgley | 156—395 |
| 2,039,532 | 5/1936 | Heston | 156—395 |
| 3,223,572 | 12/1965 | Holloway et al. | 156—408XR |

BENJAMIN A. BORCHELT, Primary Examiner

S. C. BENTLEY, Assistant Examiner

U.S. Cl. X.R.

156—408